(12) United States Patent
Bruder et al.

(10) Patent No.: US 10,477,197 B2
(45) Date of Patent: Nov. 12, 2019

(54) AUTOSTEREOSCOPIC 3D DISPLAY DEVICE USING HOLOGRAPHIC OPTICAL ELEMENTS

(71) Applicant: Covestro Deutschland AG, Leverkusen (DE)

(72) Inventors: Friedrich-Karl Bruder, Krefeld (DE); Rainer Hagen, Leverkusen (DE); Thomas Fäcke, Leverkusen (DE); Günther Walze, Leverkusen (DE); Eun Soo Kim, Seoul (KR); Yong Seok Hwang, Seoul (KR)

(*) Notice: Subject to any disclaimer, the term of this patent is extended or adjusted under 35 U.S.C. 154(b) by 122 days.

(21) Appl. No.: 15/117,475

(22) PCT Filed: Feb. 17, 2015

(86) PCT No.: PCT/EP2015/053343
§ 371 (c)(1),
(2) Date: Aug. 9, 2016

(87) PCT Pub. No.: WO2015/124582
PCT Pub. Date: Aug. 27, 2015

(65) Prior Publication Data
US 2016/0353092 A1 Dec. 1, 2016

(30) Foreign Application Priority Data
Feb. 18, 2014 (EP) .................................... 14155599

(51) Int. Cl.
*H04N 13/39* (2018.01)
*G02B 27/22* (2018.01)
(Continued)

(52) U.S. Cl.
CPC .......... *H04N 13/39* (2018.05); *G02B 27/225* (2013.01); *H04N 13/32* (2018.05); *G02B 5/32* (2013.01); *G02B 6/0036* (2013.01)

(58) Field of Classification Search
None
See application file for complete search history.

(56) References Cited

U.S. PATENT DOCUMENTS

2009/0174919 A1 7/2009 Moss
2010/0128187 A1 5/2010 Brott et al.
(Continued)

FOREIGN PATENT DOCUMENTS

JP   H042987 B2   1/1992
JP   H04355747 A   12/1992
(Continued)

OTHER PUBLICATIONS

International Search Report for PCT/EP2015/053343 dated Apr. 23, 2015.

*Primary Examiner* — Joseph W Becker

(57) ABSTRACT

An autostereoscopic 3D display device is disclosed. The device includes a first light source and a second light source configured to alternately generate light and a light guide panel arranged to guide the light from the first light source in a first direction as a first light beam and the light from the second light source in a second direction as a second light beam. In the device, a stack of a plurality of holographic optical elements is configured to converge the first light beam and the second light beam from the light guide panel. The stack of the plurality of holographic optical elements may include at least one first holographic optical element and at least one second holographic optical element.

16 Claims, 10 Drawing Sheets

(51) Int. Cl.
*H04N 13/32* (2018.01)
*F21V 8/00* (2006.01)
*G02B 5/32* (2006.01)

(56) References Cited

U.S. PATENT DOCUMENTS

| | | |
|---|---|---|
| 2011/0149202 A1 | 6/2011 | Sohn et al. |
| 2011/0170184 A1 | 7/2011 | Wolk |
| 2011/0285927 A1 | 11/2011 | Schultz et al. |
| 2013/0265625 A1 | 10/2013 | Fäcke et al. |

FOREIGN PATENT DOCUMENTS

| | | |
|---|---|---|
| JP | H095526 A | 1/1997 |
| JP | 2010262198 A | 11/2010 |
| JP | 201354120 A | 3/2013 |

AUTOSTEREOSCOPIC 3D DISPLAY DEVICE USING HOLOGRAPHIC OPTICAL ELEMENTS

CROSS-REFERENCE TO RELATED APPLICATIONS

This application is a national stage application (under 35 U.S.C. § 371) of PCT/EP2015/053343, filed Feb. 17, 2015, which claims benefit of European Application No. 14155599.5, filed Feb. 18, 2014, both of which are incorporated herein by reference in their entirety.

TECHNICAL FIELD

The present disclosure relates to autostereoscopic 3D display devices, and more specifically, to autostereoscopic 3D display devices using a plurality of holographic optical elements (HOEs).

BACKGROUND

In recent years, three-dimensional (3D) displays for viewing 3D images have become popular. For example, movie theaters equipped with 3D displays or 3D televisions may allow viewers to view 3D movies for enhanced visual experience. However, such 3D movies often require viewers to wear 3D glasses or visual aids to perceive 3D images. The use of such 3D glasses or visual aids may be inconvenient to some viewers due to the weight or discomfort of the devices.

To alleviate such inconvenience of viewers, autostereoscopic displays have been developed to allow viewers to perceive 3D images without 3D glasses or visual aids. Conventional autostereoscopic displays typically display 3D images using either a spatial-multiplexed method or a time-multiplexed method. In the spatial-multiplexed method, an optical stripe panel such as a parallax-barrier or a lenticular-sheet may be provided in an autostereoscopic display to divide the visual fields for the left and right eyes to form a pair of stereoscopic images for a viewer. However, the use of such an optical stripe panel may result in a degraded or reduced image-resolution, low light-efficiency, and narrow viewing angle.

In the time-multiplexed method, left and right view-images are displayed sequentially to allow the left and right eyes of a viewer to perceive 3D images. In this method, various types of lenses, mirror, or 3D films with prisms are typically used to form directional backlights for the left and right view-images. However, use of lenses or mirrors may result in an increase in the size of a 3D display device. In the case of 3D films with prisms, it may be difficult to precisely produce the micrometer-sized 3D films with prisms and accurately align the 3D films with prisms to a light guide structure.

SUMMARY

The present disclosure relates to autostereoscopic 3D display devices using a plurality of holographic optical elements According to one embodiment of the present disclosure, an autostereoscopic 3D display device is disclosed. The device includes a first light source and a second light source configured to alternately generate light; a light guide panel arranged to guide the light from the first light source in a first direction as a first light beam and the light from the second light source in a second direction as a second light beam; and a stack of a plurality of holographic optical elements configured to converge the first light beam and the second light beam from the light guide panel wherein the light guide panel includes a prism structure configured to reflect the light from the first and second light source toward a surface of the light guide panel adjoining the stack of the plurality of holographic optical elements, wherein the prism structure includes at least one first inclined surface having a first inclined angle and at least one second inclined surface having a second inclined angle and wherein the first and second inclined angles are less than 10°. The autostereoscopic 3D display device may advantageously provide a long viewing range in a longitudinal direction and a reduced crosstalk compared to conventional autostereoscopic 3D display systems using a parallax-barrier or a lenticular-sheet.

The specific advantage of the prism structure of the above embodiment is that it may redirect the light from the first and second light sources as a pair of quasi-collimated or substantially collimated light beams. Furthermore, the light from the first and second light sources may be reflected a number of times from the at least one first inclined surface and/or the at least one second inclined surface to enhance and homogenize the light distribution inside the light guide panel. Moreover, the specific advantage of the inclined angles of less than 10° is that they may enhance collimation of the light beams that are refracted out of the light guide panel towards the stack of the plurality of holographic optical elements In some embodiments, the stack of the plurality of holographic optical elements may include at least one first holographic optical element and at least one second holographic optical element, and the at least one first holographic optical element may converge the first light beam to a first location while the at least one second holographic optical element may converge the second light beam to a second location. The autostereoscopic 3D display device including the stack of the plurality of holographic optical elements may provide high diffraction efficiency and therefor a high brightness of the images.

In some embodiments, the at least one first holographic optical element may include one or more first photopolymer films configured to diffract one or more predetermined wavelengths of the first light beam, and the at least one second holographic optical element may include one or more second photopolymer films configured to diffract the one or more predetermined wavelengths of the second light beam. The autostereoscopic 3D display device with the one or more first and second photopolymer films may diffract one or more predetermined wavelengths of the first and second light beams to enable a full color display.

In some embodiments, each of the one or more first and second photopolymer films may be configured to diffract a red, green, or blue wavelength. Diffracting the red, green, or blue wavelength may enable a full color display.

In some embodiments, each of the plurality of holographic optical elements may include an interference pattern of a parallel light beam and a diverging light beam. The holographic optical elements with the interference patterns form a pair of converging light fields in front of a pair of eyes of a viewer.

In some embodiments, each of the plurality of holographic optical elements may be a volume holographic optical element. The volume holographic optical element may reduce color crosstalk and improve diffraction efficiency such that brightness of light outputted for a viewer may be enhanced.

In some embodiments, the light guide panel may be configured to refract the light reflected from the prism structure toward the stack of the plurality of holographic optical elements with a refraction angle greater than 45° with respect to a direction normal to the surface of the light guide panel adjoining the stack of the plurality of holographic optical elements. The light refracted with the refraction angle greater than 45° in combination with the plurality of holographic optical elements may reduce color crosstalk between light fields converged to a pair of eyes of a viewer.

In some embodiments, the light guide panel may be configured to guide the light from the first and second light sources as the first and second light beams having a substantially uniform intensity distribution. Such uniform intensity distribution may enhance the homogeneity of the brightness of the light outputted for a viewer.

In some embodiments, an angular bandwidth of the refracted light may be less than 30°. Such a narrow angular bandwidth may enhance collimation of the refracted light, improve diffraction efficiency, and reduce crosstalk between light fields converged to a pair of eyes of a viewer.

In some embodiments, the autostereoscopic 3D display device may further include a display panel configured to display a first set of images and a second set of images; and a control unit configured to alternately activate the first and second light sources and control the display panel to alternately display one of the first set of images and one of the second set of images. The autostereoscopic 3D display device may time-multiplex the first and second sets of images to be projected for a viewer without reduction in a display resolution.

In some embodiments, the control unit may be configured to generate one or more control signals to synchronize the display of the one of the first set of images and the one of the second set of images with the activation of the first and second light sources. Use of such control signals may efficiently drive the display panel in synchronization with the first and second light sources for displaying stereoscopic images.

In some embodiments, the one of the first set of images and the one of the second set of images may correspond to a pair of stereoscopic images, and the control unit may be configured to control the display of the first and second sets of images based on a vertical synchronization signal generated for displaying each pair of the stereoscopic images or a predetermined number of horizontal synchronization signals. Generating the vertical synchronization signal from the horizontal synchronization signals may allow display of 3D stereoscopic images including the first and second sets of images at a higher frequency or frame rate to reduce flickering.

In some embodiments, each of the plurality of holographic optical elements may include one or more interference patterns recorded by illuminating a reference beam on the holographic optical element based on one or more first incident angles and an object beam on the holographic optical element based on one or more second incident angles. By recording interference patterns separately on different holographic optical elements, diffraction efficiency of the holographic optical elements may be enhanced. A stack of such holographic optical elements may enable a full color display.

In some embodiments, the one or more interference patterns may be configured to diffract one or more predetermined wavelengths. The diffraction of one or more predetermined wavelengths by the interference patterns may enable a full color display.

In some embodiments, the first incident angles of the plurality of holographic optical elements may be different from each other, and the second incident angles of the plurality of holographic optical elements may be different from each other. Recording interference patterns in the holographic optical elements using different incident angles may enhance diffraction efficiency for different colors.

In some embodiments, a pair of angles including one of the first incident angles and one of the second incident angles may be determined based on a Bragg-angle condition for a red, green, or blue wavelength. Recording interference patterns using incident angles that satisfy the Bragg-angle condition may enhance diffraction efficiency and increase brightness of light outputted for a viewer.

In some embodiments, the first and second light beams may be quasi-collimated or substantially collimated with an angular bandwidth of less than 30°. Such quasi-collimated or substantially collimated light beams may improve diffraction efficiency and reduce crosstalk between light fields converged to a pair of eyes of a viewer.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the inventive aspects of this disclosure. However, it will be apparent to one of ordinary skill in the art that the inventive aspects of this disclosure may be practiced without these specific details. In other instances, well-known methods, procedures, systems, and components have not been described in detail so as not to unnecessarily obscure aspects of the various embodiments.

Figure 1:
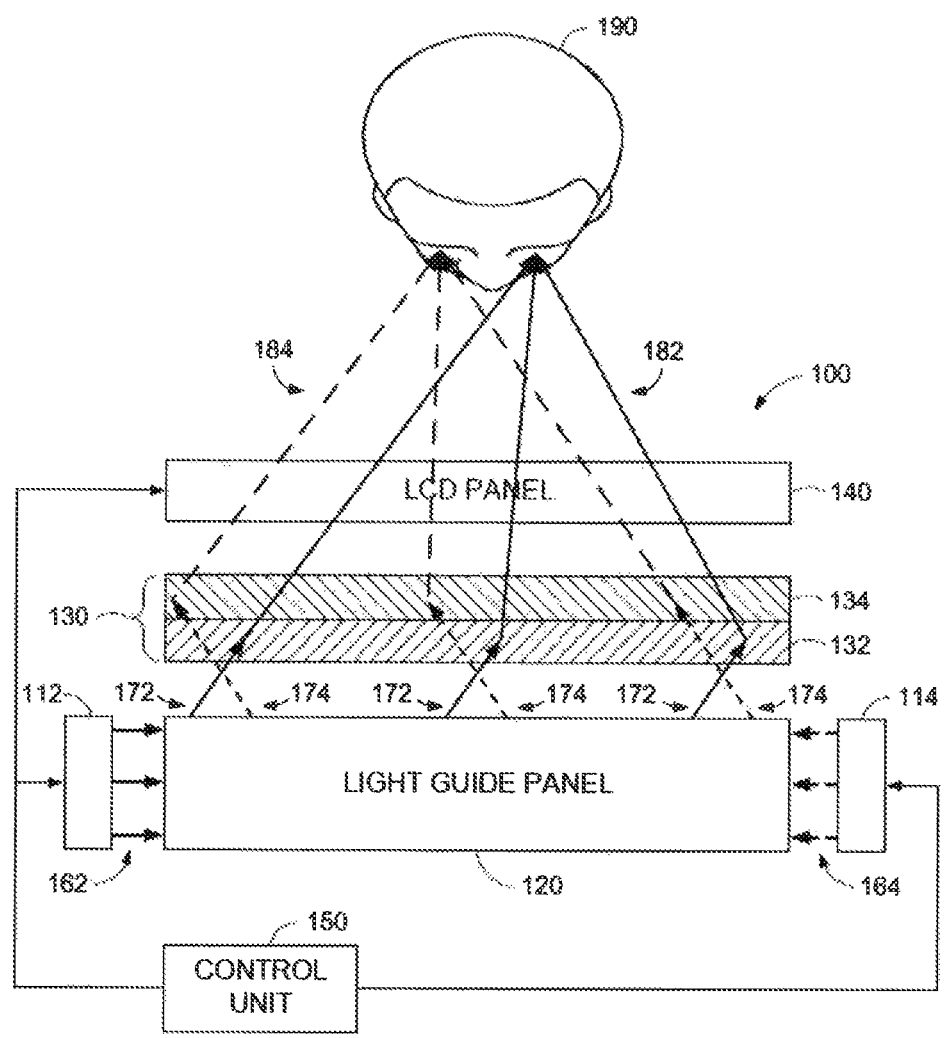
FIG. 1 illustrates an autostereoscopic 3D display device configured to project a pair of stereoscopic images displayed on a liquid crystal display (LCD) panel that can be perceived as a 3D image by a viewer, according to one embodiment of the present disclosure.

FIG. 1 illustrates an autostereoscopic 3D display device 100 configured to project a pair of stereoscopic images displayed on an LCD panel 140 that can be perceived as a 3D image by a viewer 190, according to one embodiment of the present disclosure. The autostereoscopic 3D display device 100 includes a pair of light sources 112 and 114, a light guide panel 120, a stack 130 of at least two holographic optical elements (HOEs) 132 and 134, the LCD panel 140, and a control unit 150. The control unit 150 is configured to drive the LCD panel 140 for displaying the pair of stereoscopic images in synchronization with the light sources 112 and 114.

As shown, the control unit 150 is coupled to the LCD panel 140 and the light sources 112 and 114 for synchronously displaying the pair of stereoscopic images. In one embodiment, the pair of stereoscopic images may include a right-view image and a left-view image, which can be perceived by a right eye and a left eye, respectively, of the viewer 190. For projecting the pair of stereoscopic images, the control unit 150 may drive the LCD panel 140 to display the left-view image for the left eye and activate the light source 112. The control unit 150 may then drive the LCD panel 140 to display the right-view image for the right eye and activate the light source 114. By alternately activating the light sources 112 and 114 in synchronization with the stereoscopic images provided to the LCD panel 140 for the left and right eyes, a 3D image may be projected for the left and right eyes of the viewer 190. Although the illustrated embodiment is described with a pair of stereoscopic images, it may also sequentially and alternately display and project a plurality of pairs of stereoscopic images for the viewer 190.

Under the control of the control unit 150, the light sources 112 and 114 are configured to alternately generate light 162 and light 164, respectively. The light sources 112 and 114 may serve as backlight units (BLUs) for alternately illuminating the stereoscopic images that are alternately displayed on the LCD panel 140 for the left and right eyes. As shown in FIG. 1, the light sources 112 and 114 are arranged to emit the light 162 and the light 164, respectively, into or toward the light guide panel 120. In one embodiment, the light sources 112 and 114 may be arranged to emit the light 162 and 164, respectively, from opposite sides (e.g., left and right sides) of the light guide panel 120. In some embodiments, the light sources 112 and 114 may include one or more gas discharge lamps, laser diodes, or light emitting diodes (LEDs) such as white LEDs, sets of red, blue, green LEDs, sets of complementary color LEDs, single color LEDs, and the like.

The light guide panel 120 is configured to guide the light 162 from the light source 112 in a first direction and the light 164 from the light source 114 in a second direction. For example, the light 162 from the light source 112 may be guided within the light guide panel 120 and outputted as a first collimated light beam 172 as indicated with solid arrows in FIG. 1. On the other hand, the light 164 from the light source 114 may be guided within the light guide panel 120 and outputted as a second collimated light beam 174 as indicated with dotted arrows in FIG. 1. The first and second collimated light beams 172 and 174 may also be substantially collimated or quasi-collimated light beams. The light guide panel 120 may be formed of any suitable transparent or semi-transparent material or medium such as plastic (e.g., polymethyl methacrylate, polycarbonate, etc.), glass, and the like that can be used to guide light in a specified direction as a quasi-collimated or substantially collimated light beam. For example, a quasi-collimated light beam or a substantially collimated light beam may have an angular bandwidth of less than 30° measured as a full width at half maximum (FWHM).

The light beam 172 in the first direction and the light beam 174 in the second direction are incident on the stack 130 of the holographic optical elements 132 and 134. Each of the holographic optical elements 132 and 134 is configured to include an interference pattern of a parallel light beam (e.g., a reference beam) and a diverging light beam (e.g., an object beam). The interference patterns may be recorded in the holographic optical elements 132 and 134 as volume phase gratings. In this case, the parallel light beam may be a plane wave, and the diverging light beam may be a spherical wave.

In the illustrated stack 130 of the holographic optical elements 132 and 134, the holographic optical elements 132 and 134 with the interference patterns are configured to converge the light beams 172 and 174 from the light guide panel 120 into a pair of object beams 182 and 184, respectively. For example, the holographic optical element 132 converges the light beam 172 from the light guide panel 120 into the object beam 182 that converges on a location corresponding to the left eye of the viewer 190. On the other hand, the holographic optical element 134 converges the light beam 174 from the light guide panel 120 into the object beam 184 that converges on a location corresponding to the right eye of the viewer 190. In some embodiments, converging light (e.g., a light beam) means that the wavefront of the light may be locally characterized by two negative radii of curvature as in the case of a refractive or reflective optical element such as a converging lens, a converging mirror, or the like. In the case of a plurality of holographic optical elements, the negative radii of curvature may be different for each holographic optical element.

The converging object beams 182 and 184 from the holographic optical elements 132 and 134, respectively, pass through the LCD panel 140 to project the pair of stereoscopic images displayed on the LCD panel 140 at the pair of locations corresponding to the left and right eyes, respectively. When the left-view image is displayed on the LCD panel 140 and the light source 112 is activated, the converging object beam 182 passes through the LCD panel 140 to project the left-view image to the left eye of the viewer 190. Similarly, when the right-view image is displayed on the LCD panel 140 and the light source 114 is activated, the converging object beam 184 passes through the LCD panel 140 to project the right-view image to the right eye of the viewer 190. By alternately viewing the left and right-view images via the left and right eyes, the viewer 190 may perceive a 3D image.

Although the illustrated autostereoscopic 3D display device 100 is described as using the LCD panel 140, it may employ any suitable display panels through which the converging object beams 182 and 184 can pass. In addition, the at least two holographic optical elements 132 and 134 may include any suitable number of holographic optical elements and may be stacked in any suitable order. Further, each of the holographic optical elements 132 and 134 may be a volume holographic optical element (VHOE).

Figure 2:
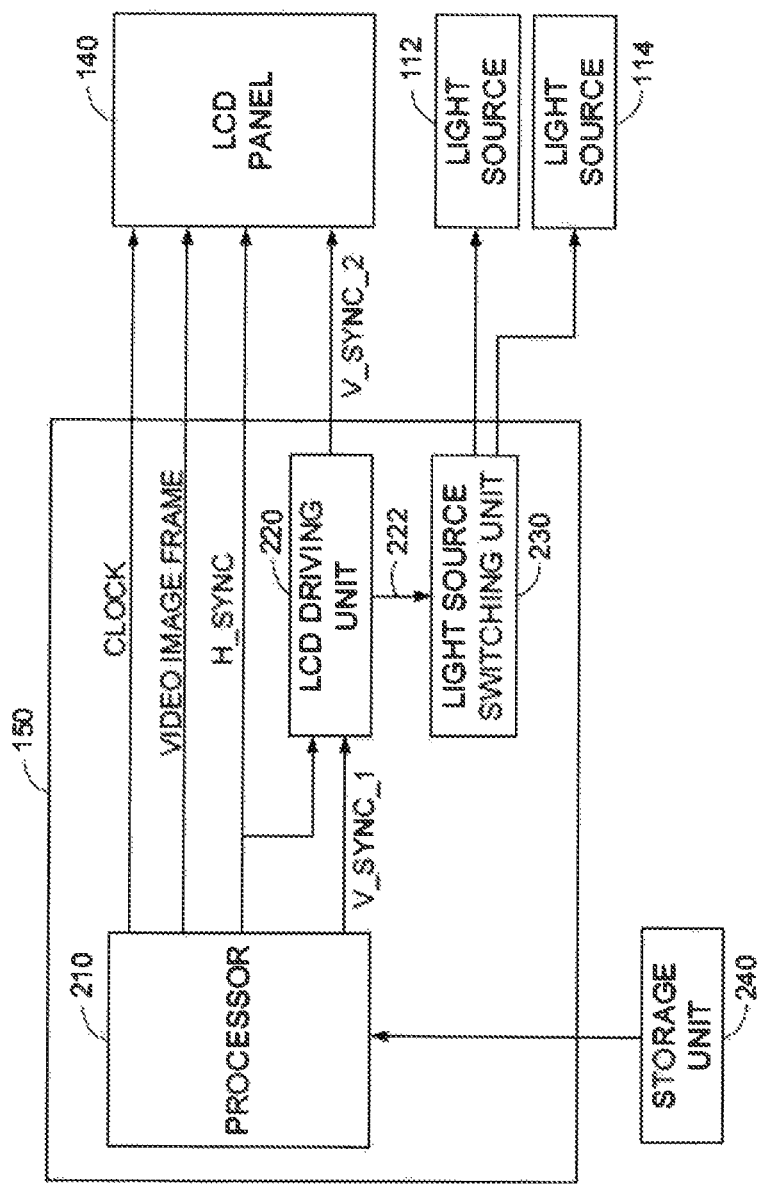
FIG. 2 illustrates a block diagram of a control unit configured to control an LCD panel and light sources for projecting stereoscopic images in an autostereoscopic 3D display device, according to one embodiment of the present disclosure.

FIG. 2 illustrates a block diagram of the control unit 150 configured to control the LCD panel 140 and the light sources 112 and 114 for projecting stereoscopic images in the autostereoscopic 3D display device 100, according to one embodiment of the present disclosure. The control unit 150 includes a processor 210, an LCD driving unit 220, and a light source switching unit 230. The autostereoscopic 3D display device 100 includes a storage unit 240 that stores a plurality of pairs of stereoscopic images including a set of left-view images and a set of right-view images. Alternatively, the storage unit 240 may be external to the autostereoscopic 3D display device 100.

In one embodiment, each pair of stereoscopic images may correspond to an image frame and may be stored according to a specified frame rate such as 30 frames per second (e.g., 30 Hz). In this case, a plurality of video image frames corresponding to the plurality of pairs of stereoscopic images may be sequentially stored in the storage unit 240 to be displayed at the specified frame rate. For example, each video image frame may be formatted to sequentially store a left-view image and a right-view image with an end-of-frame indicator at an end of the right-image according to a top-down method. Further, each video image frame may be formatted based on a specified resolution (e.g., m×n). The storage unit 240 may be implemented using any suitable type of memory devices including, but not limited to, a RAM (Random Access Memory), a ROM (Read Only Memory), an EEPROM (Electrically Erasable Programmable Read Only Memory), a flash memory, and the like, for storing the video image frames.

The processor 210 may sequentially access video image frames corresponding to pairs of stereoscopic images from the sets of corresponding left and right-view images in the storage unit 240 for alternately displaying left-view images and right-view images. As a video image frame is accessed, the processor 210 generates a horizontal synchronization signal H_SYNC based on a horizontal resolution of the video image frame and/or the LCD panel 140, and a vertical synchronization signal V_SYNC_1 based on the end-of-frame indicator. The processor 210 sequentially provides the video image frames to the LCD panel 140 as display data along with a clock signal CLOCK and the H_SYNC signal. In addition, the processor 210 provides the H_SYNC signal and the V_SYNC_1 signal to the LCD driving unit 220.

Based on the H_SYNC signal and the V_SYNC_1 signal, the LCD driving unit 220 generates one or more control signals to synchronize the display of the LCD panel 140 and the activation of the light sources 112 and 114. As shown, the control signals include another vertical synchronization signal V_SYNC_2 and a switching signal 222. In one embodiment, the LCD driving unit 220 generates the V_SYNC_2 signal based on the received V_SYNC_1 signal for an end of each video image frame. In addition, the V_SYNC_2 signal is generated at an end of a left-view image in a video image frame. Accordingly, the V_SYNC_2 signal is generated to indicate an end of each of the left-view images and an end of each of the video image frames, thereby doubling a frequency of the V_SYNC_1 signal. For example, given a frame rate of 30 frames per second (e.g., 30 Hz), the LCD driving unit 220 generates the V_SYNC_2 signal with a frame rate of 60 frames per second (e.g., 60 Hz). The LCD driving unit 220 provides the V_SYNC_2 signal to the LCD panel 140, which alternately displays a left-view image and a right-view image of a video image frame received from the processor 210 based on the V_SYNC_2 signal.

In one embodiment, the LCD driving unit 220 generates the switching signal 222 in synchronization with the V_SYNC_2 signal to synchronize the activation of the light sources 112 and 114 with the display of the left-view image and the right view image, respectively. When the V_SYNC_2 signal corresponds to an end of a left-view image, the switching signal 222 is generated to indicate switching to the light source 112. On the other hand, when the V_SYNC_2 signal corresponds to an end of a video image frame, the switching signal 222 is generated to indicate switching to the light source 114.

In response to the switching signal 222 from the LCD driving unit 220, the light source switching unit 230 switches between the light sources 112 and 114. For example, the light source switching unit 230 may activate the light source 112 when the switching signal 222 indicates switching to the light source 112. Similarly, the light source 114 may be activated when the switching signal 222 indicates switching to the light source 114.

Although the video image frame is described as being formatted to sequentially store a left-view image and a right-view image with an end-of-frame indicator at an end of the right-image, it may be formatted to sequentially store a right-view image and a left-view image with an end-of-frame indicator at an end of the left-view image. In this case, the processor 210 generates the V_SYNC_1 signal based on the end-of-frame indicator for each video image frame. In addition, the LCD driving unit 220 generates the V_SYNC_2 signals for the ends of both the right-view image and the video image frame based on the V_SYNC_1 signal and the H_SYNC signal. Upon receiving the V_SYNC_2 signal from the LCD driving unit 220, the LCD panel alternately displays the right-view image and the left-view image in synchronization with the activation of the light sources 114 and 112.

Figure 3:
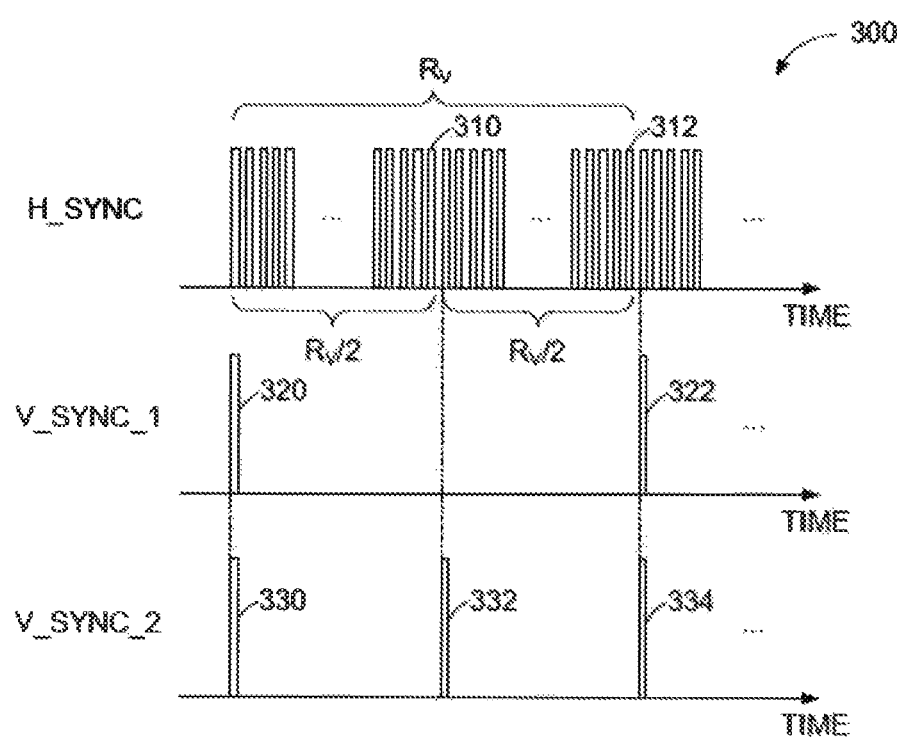
FIG. 3 illustrates a timing diagram for generating V_SYNC_2 signals by an LCD driving unit based on H_SYNC signals and V_SYNC_1 signals, according to one embodiment of the present disclosure.

FIG. 3 illustrates a timing diagram 300 for generating V_SYNC_2 signals 330, 332, and 334 by the LCD driving unit 220 based on H_SYNC signals and V_SYNC_1 signals 320 and 322, according to one embodiment of the present disclosure. As described above with reference to FIG. 2, the LCD driving unit 220 receives the H_SYNC signals including a plurality of pulses and the V_SYNC_1 signals 320 and 322 from the processor 210. From the received H_SYNC signals and V_SYNC_1 signals 320 and 322, the LCD driving unit 220 generates the V_SYNC_2 signals 330, 332, and 334 with a double the frequency of the V_SYNC_1 signals 320 and 322 to indicate an end of a left-view image in each video image frame (or a right-view image) and an end of the video image frame.

In one embodiment, the processor 210 generates the V_SYNC_1 signals 320 and 322 based on a frame rate for the video image frames stored in the storage unit 240. In addition, the processor 210 generates the H_SYNC signals based on the frame rate and a vertical resolution $V_R$ for each video image frame. For example, when the frame rate is 30 Hz and the vertical resolution $V_R$ is 1,102 pixels, the V_SYNC_1 signals 320 and 322 are generated by the processor 210 at a frequency of 30 Hz and the H_SYNC signals are generated at a frequency of 33,060 Hz (i.e., 30 Hz×1,102 pixels).

In response to receiving the V_SYNC_1 signal 320, the LCD driving unit 220 is configured to generate the V_SYNC_2 signal 330 and count the number of H_SYNC signals received from the processor 210. When the number of counted H_SYNC signals is $R_V/2$, the LCD driving unit 220 generates the V_SYNC_2 signal 332 to indicate an end of the left-view image (or the right-view image). When the next V_SYNC_1 signal 322 is received, the V_SYNC_2 signal 334 is generated to indicate an end of the video image frame. The number of H_SYNC signals counted may be reset at any suitable time upon generating the V_SYNC_2 signal 332 and subsequent H_SYNC signals may be counted upon generating the V_SYNC_2 signal 334. This process may be repeated for generating the V_SYNC_2 signals at a double the frequency of the frame rate for the stored video image frames (e.g., 60 Hz).

Figure 4:
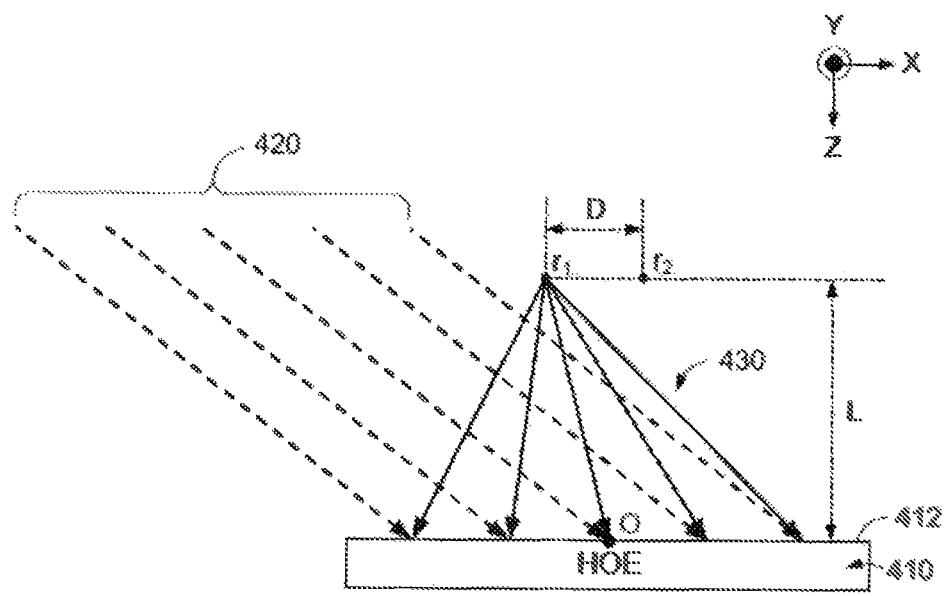
FIG. 4 illustrates recording of an interference pattern by irradiating a reference beam and an object beam on a holographic optical element, according to one embodiment of the present disclosure.

FIG. 4 illustrates recording of an interference pattern by irradiating a reference beam 420 and an object beam 430 on a holographic optical element 410, according to one embodiment of the present disclosure. As illustrated, the reference beam 420 may be substantially collimated or quasi-collimated to form a plane wave. The reference beam 420 is irradiated on the holographic optical element 410 with a predetermined angle of incidence with respect to a top surface 412 of the holographic optical element 410.

In FIG. 4, a center point O on the top surface 412 of the holographic optical element 410 serves as a reference point with a reference coordinate (0, 0, 0). A pair of points $r_1$ and $r_2$ corresponds to locations of right and left eyes, respectively, of a viewer. A viewing distance L indicates a predetermined distance between the holographic optical element 410 and the point $r_1$ or $r_2$ for the right or left eye of the viewer. Further, a distance D indicates an inter-ocular distance between the points $r_1$ and $r_2$. Accordingly, the points $r_1$ and $r_2$ may be denoted with coordinates (−D/2, 0, −L) and (D/2, 0, −L), respectively. For example, the viewing distance L may be 300 mm and the inter-ocular distance D may be 65 mm. In some embodiments, the viewing distance L may be any suitable distance greater than 100 mm while the interocular distance D may be any distance suitable for representing a distance between the eyes and may range from 50 mm to 75 mm.

The object beam 430 is a diverging or substantially spherical beam that is irradiated on the holographic optical element 410. As shown, the object beam 430 diverges from the point $r_1$ corresponding to the location of the right eye of the viewer and is directed to the top surface 412 of the holographic optical element 410. In one embodiment, the collimated reference beam denoted by $E_R$ and the diverging object beam denoted by $E_S$ may be expressed by the following equations:

$$E_R(x,y,z) = I_R^{1/2} \exp(-jK_R \cdot r) \quad \text{Eq. (1)}$$

$$E_S(x,y,z) = I_S^{1/2} \exp(-jK_S(r-r_1)\cdot(r-r_1))/|r-r_1| \quad \text{Eq. (2)}$$

where $I_R$ and $I_S$ indicate intensities of the reference beam 420 and the object beam 430, respectively, $K_R$ and $K_S$ indicate wave vectors of the reference beam 420 and the object beam 430, respectively, and r denotes a vector from the center point O with a coordinate (0, 0, 0) to a point r with a coordinate (x, y, z).

When the reference beam 420 and the object beam 430 irradiate the holographic optical element 410, an interference pattern may be recorded in the holographic optical element 410 as volume phase gratings. Based on Equations (1) and (2) above, the interference pattern that satisfies the Bragg condition may be expressed by the following equation:

$$\begin{aligned} I(r) &= \left| I_R^{1/2} \exp(-jK_R \cdot r) + \right. \\ &\quad \left. I_S^{1/2} \exp(-jK_S(r-r_1)\cdot(r-r_1))/|r-r_1| \right|^2 = \\ &= I_R(r) + I_S(r-r_1)/|r-r_1|^2 + 2(I_R(r)I_S(r-r_1)/|r-r_1|)^{1/2} \\ &\quad \cos(K_S(r-r_1)\cdot(r-r_1) - K_R \cdot r) = \\ &= I_R(r) + I_S(r-r_1)/|r-r_1|^2 + 2(I_R(r)I_S(r-r_1)/|r-r_1|)^{1/2} \\ &\quad \cos(K_G(r-r_1)\cdot r - K_S(r-r_1)\cdot r_1) \end{aligned} \quad \text{Eq. (3)}$$

where $K_G$ denotes a wave vector of the gratings and the Bragg condition among the wave vectors $K_R$, $K_S$, and $K_G$ is expressed by $K_G = K_S - K_R$.

In a similar manner, another pair of a reference beam and an object beam (not shown) may be irradiated on the holographic optical element 410. In this case, the reference beam may also be substantially collimated or quasi-collimated to form a plane wave. Further, the object beam may diverge from the point $r_2$ corresponding to the left eye of the viewer to be directed to the top surface 412 of the holographic optical element 410. When the pair of the reference beam and the object beam irradiates the holographic optical element, an interference pattern may be recorded in the holographic optical element 410 as volume phase gratings. The interference pattern that satisfies the Bragg condition may be expressed by the following equation:

$$\begin{aligned} I(r) &= \left| I_R^{1/2} \exp(-jK_R \cdot r) + \right. \\ &\quad \left. I_S^{1/2} \exp(-jK_S(r-r_2)\cdot(r-r_2))/|r-r_2| \right|^2 = \\ &= I_R(r) + I_S(r-r_2)/|r-r_2|^2 + 2(I_R(r)I_S(r-r_2)/|r-r_2|)^{1/2} \\ &\quad \cos(K_S(r-r_2)\cdot(r-r_2) - K_R \cdot r) = \\ &= I_R(r) + I_S(r-r_2)/|r-r_2|^2 + 2(I_R(r)I_S(r-r_2)/|r-r_2|)^{1/2} \\ &\quad \cos(K_G(r-r_2)\cdot r - K_S(r-r_2)\cdot r_2) \end{aligned} \quad \text{Eq. (4)}$$

where $I_R$ and $I_S$ indicate intensities of the reference beam and the object beam, respectively, $K_R$, $K_S$, and $K_G$ indicate wave vectors of the reference beam, the object beam, and the gratings, respectively, and the Bragg condition among the wave vectors $K_R$, $K_S$, and $K_G$ is expressed by $K_G = K_S - K_R$.

Figure 5:
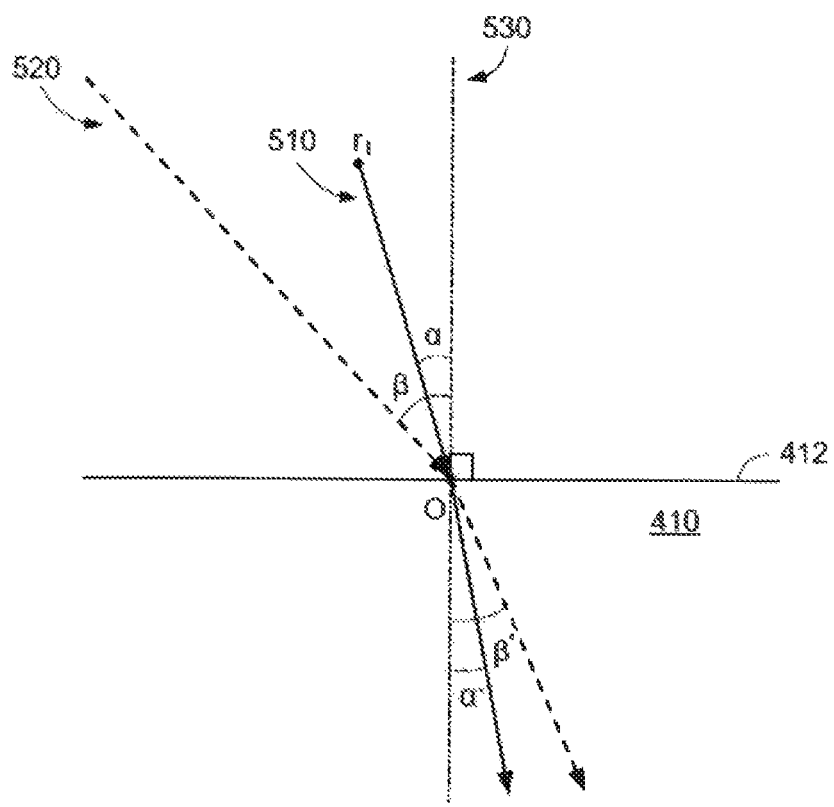
FIG. 5 illustrates incident angles of a ray of an object beam and a ray of a reference beam, respectively, that are directed to a reference center point on a top surface of a holographic optical element, according to one embodiment of the present disclosure.

FIG. 5 illustrates incident angles α and β of a ray 510 of the object beam 430 and a ray 520 of the reference beam 420, respectively, that are directed to the reference center point O on the top surface 412 of the holographic optical element 410, according to one embodiment of the present disclosure. As shown, the ray 510 of the object beam 430 is irradiated from the point $r_1$ corresponding to the right eye of the viewer to the center point O on the top surface 412 of the holographic optical element 410. The ray 510 forms the incident angle α with respect to a line 530 normal to the top surface 412. On the other hand, the ray 520 of the reference beam 420 is irradiated on the center point O in the top surface 412 of the holographic optical element 410 with the incident angle β with respect to the normal line 530.

In the illustrated embodiment, the ray 510 incident on the top surface 412 is refracted in the holographic optical element 410 with an angle of refraction α' with respect to the normal line 530. Similarly, the ray 520 incident on the top surface 412 is refracted in the holographic optical element 410 with an angle of refraction β' with respect to the normal line 530. Based on Snell's law, relationships between the incident angles α and β and the angles of refraction α' and β' may be expressed as follows:

$$n_{air} \cdot \sin \alpha = n_p \cdot \sin \alpha' \quad \text{Eq. (5)}$$

$$n_{air} \cdot \sin \beta = n_p \cdot \sin \beta' \quad \text{Eq. (6)}$$

where $n_{air}$ indicates an index of refraction for air and $n_p$ indicates an index of refraction for the holographic optical element 410. For example, the index of refraction $n_p$ for the holographic optical element 410 may be 1.485.

When the rays 510 and 520 illuminate the holographic optical element 410, an interference pattern between the rays 510 and 520 is formed and recorded in the holographic optical element 410 as volume phase gratings, as described above with reference to FIG. 4. The interference pattern (or the volume phase gratings) may vary according to a wavelength of the rays 510 and 520 that may correspond to a red, green, or blue color. For example, the interference pattern may be recorded by illuminating the rays 510 and 520 of green light.

In one embodiment, when the rays 510 and 520 of green light, for example, having a wavelength of 532 nm, are incident on the holographic optical element 410 with incident angles $\alpha_g$ and $\beta_g$, the rays 510 and 520 form angles of refraction $\alpha_g'$ and $\beta_g'$ in the holographic optical element 410. In this case, a half angle $\theta_g$ of the incident angles $\alpha_g$ and $\beta_g$ for the green light may be defined by the following equation:

$$\theta_g = \frac{\alpha_g + \beta_g}{2} \quad \text{Eq. (7)}$$

Similarly, a half angle $\theta_g'$ of the angles of refraction $\alpha_g'$ and $\beta_g'$ for the green light may be defined by the following equation:

$$\theta_g' = \frac{\alpha_g' + \beta_g'}{2} \quad \text{Eq. (8)}$$

Based on the half angle $\theta_g'$ for the green light, when a period $\Lambda_g$ of the volume phase gratings for the green light, which are recorded in the holographic optical element 410, satisfies the Bragg-angle condition, the grating period $\Lambda_g$ for the green light may be expressed by the following equation:

$$\Lambda_g = \frac{\lambda_g}{2 \cdot n_p \cdot \sin \theta_g'} \quad \text{Eq. (9)}$$

where $\lambda_g$ indicates the wavelength of the green light, for example, 532 nm.

Given the half angle $\theta_g'$ for the green light, grating periods $\Lambda_r$ and $\Lambda_b$ for red light and blue light, respectively, that satisfy the Bragg-angle condition may be expressed by the following equations, respectively:

$$\Lambda_r = \frac{\lambda_r}{2 \cdot n_p \cdot \sin \theta_g'} \quad \text{Eq. (10)}$$

$$\Lambda_b = \frac{\lambda_b}{2 \cdot n_p \cdot \sin \theta_g'} \quad \text{Eq. (11)}$$

where $\lambda_r$ indicates a wavelength of red light (e.g., 633 nm) and $\lambda_b$ indicates a wavelength of blue light (e.g., 490 nm).

Once the grating period $\Lambda_r$ for red light is determined, a half angle $\theta_r'$ of incident angles $\alpha_r'$ and $\beta_r'$ for red light may be obtained by the following equation:

$$\theta_r' = \sin^{-1}\left(\frac{\Lambda_g}{\Lambda_r} \sin \theta_g'\right) = \frac{\alpha_r' + \beta_r'}{2} \quad \text{Eq. (12)}$$

Likewise, a half angle $\theta_b'$ of incident angles $\alpha_b'$ and $\beta_b'$ for blue light may be obtained by the following equation:

$$\theta_b' = \sin^{-1}\left(\frac{\Lambda_g}{\Lambda_b} \sin \theta_g'\right) = \frac{\alpha_b' + \beta_b'}{2} \quad \text{Eq. (13)}$$

As described above, if the incident angles $\alpha_g'$ and $\beta_g'$ for green light are determined, the half angle $\theta_r'$ for red light and the half angle $\theta_b'$ for blue light may be obtained based on the above equations. Further, once the half angle $\theta_r'$ for red light is obtained, the incident angles $\alpha_r'$ and $\beta_r'$ for red light may be determined to be any suitable values satisfying Equation (12) above. Similarly, once the half angle $\theta_b'$ for blue light is obtained, the incident angles $\alpha_b'$ and $\beta_b'$ for blue light may be determined to be any suitable values satisfying Equation (13). In addition to the selection criteria for $\alpha_g'$, $\beta_g'$, $\alpha_r'$, $\beta_r'$, $\alpha_b'$ and $\beta_b'$ described in Equation (12) and Equation (13), the identities $\alpha_g' - \beta_g' = \alpha_r' - \beta_r' = \alpha_b' - \beta_b'$ may also be fulfilled. The respective angles in air can be determined using Snell's law in Equation (5) and Equation (6).

In one embodiment, when the index of refraction $n_p$ for the holographic optical element 410 is 1.485, the incident angles $\alpha_g$ and $\beta_g$ for green light may be configured to be 6° and 55°, respectively. Based on these incident angles for green light, the incident angles $\alpha_r$ and $\beta_r$ for red light may be determined to be 1.4° and 48.7°, respectively, and the incident angles $\alpha_b$ and $\beta_b$ for blue light may be determined to be 8.5° and 58.8°, respectively. In this manner, pairs of the incident angles $\alpha_r$ and $\beta_r$, $\alpha_g$ and $\beta_g$, and $\alpha_b$ and $\beta_b$ for red, green, and blue colors may be obtained. Although the rays 510 and 520 in the illustrated embodiment are described as being green light, they may also be any other suitable colors or wavelengths of light and incident angles of the rays 510 and 520 for other colors or wavelengths may be obtained therefrom.

Once the incident angles for the red, green, and blue colors have been obtained, the rays 510 and 520 of one of the red, green, and blue colors may be irradiated on the holographic optical element 410 at a pair of associated incident angles $\alpha_r$ and $\beta_r$, $\alpha_g$ and $\beta_g$, or $\alpha_b$ and $\beta_b$. As a result, an interference pattern which is associated with the pair of incident angles (i.e., a pair of $\alpha_r$ and $\beta_r$, a pair of $\alpha_g$ and $\beta_g$, or a pair of $\alpha_b$ and $\beta_b$) is recorded in the holographic optical element 410. In a reconstruction mode, when a reference beam is irradiated on the holographic optical element 410, the recorded interference pattern is configured to converge the reference beam at the location corresponding to the point $r_1$. In some embodiments, a wavelength of the reference beam irradiated on the holographic optical element 410 may deviate by a certain extent from the Bragg-angle condition, under which the interference pattern in the holographic optical element 410 was recorded. By deviating from the Bragg-angle condition, colors may be misaligned to some extent and this may lead to display of a wider gamut of colors and may reduce color crosstalk.

The embodiments in FIGS. 4 and 5 above are illustrated with reference to the object beam 430 and the ray 510, which originate from the point $r_1$ corresponding to the right eye, and the reference beam 420 that is incident from the left-hand side. However, the embodiments are equally applicable to the case in which an object beam is diverging from the point $r_2$ corresponding to the left eye and a reference beam is incident on the holographic optical element 410 from the right-hand side. In this case, the object beam may include a ray directed from the point $r_2$ to the center point O.

Figure 6:
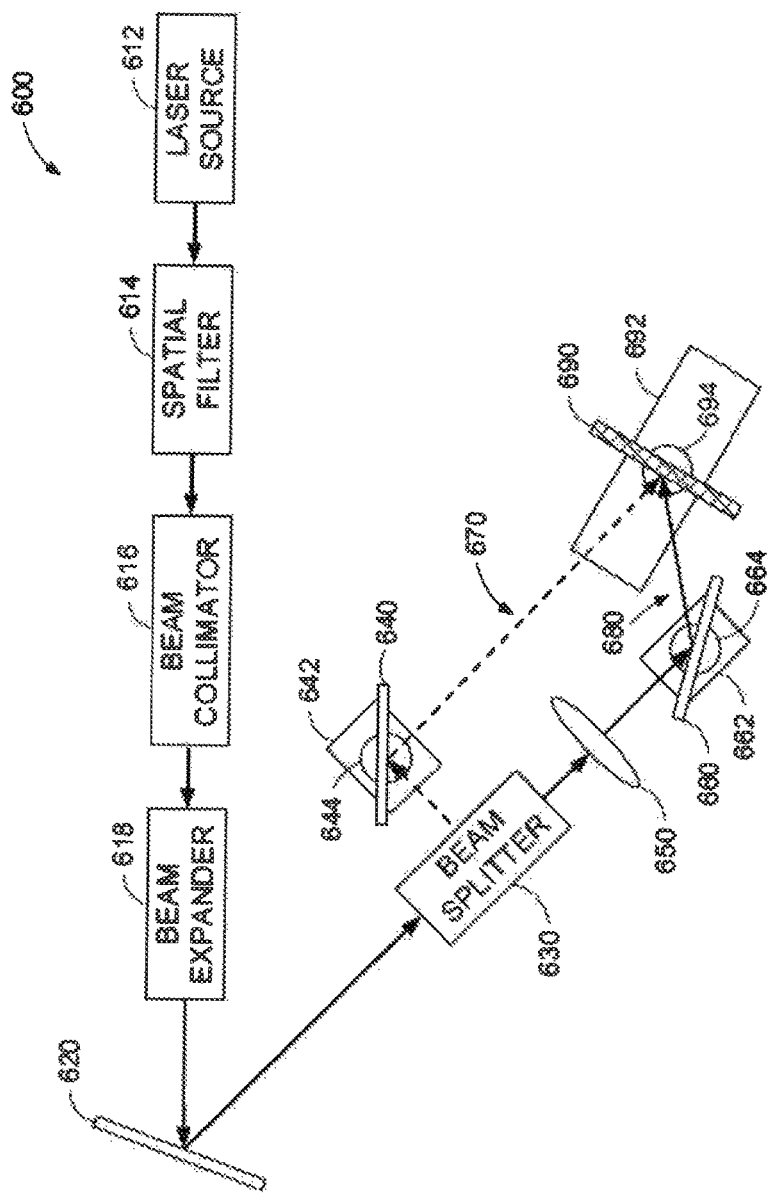
FIG. 6 illustrates a block diagram of a recording system configured to record a pattern of interference between a reference beam and an object beam in a holographic optical element, according to one embodiment of the present disclosure.

FIG. 6 illustrates a block diagram of a recording system 600 configured to record a pattern of interference between a reference beam 670 and an object beam 680 in a holographic optical element 690, according to one embodiment of the present disclosure. The recording system 600 includes a laser source 612, a spatial filter 614, a beam collimator 616, and a beam expander 618 for generating a collimated beam. The laser source 612 is configured to emit a laser beam of a specified wavelength. The spatial filter 614 receives and filters the laser beam from the laser source 612 to enhance an intensity profile of the laser beam. The beam collimator 616 is configured to produce a collimated beam from the filtered laser beam and the beam expander 618 expands the collimated beam from the beam collimator 616 by increasing a diameter of the collimated beam.

The recording system 600 further includes a mirror 620 configured to direct the collimated beam from the beam expander 618 to a beam splitter 630. The beam splitter 630 divides the collimated beam into a pair of light beams for producing the reference beam 670 and the object beam 680. One of the pair of light beams is directed to a mirror 640, which is mounted on a moving stage 642 and a rotation stage 644. By controlling the moving stage 642 and the rotation stage 644, the mirror 640 can be configured to reflect the light beam to the holographic optical element 690 as the reference beam 670 with a specified incident angle.

The other light beam from the beam splitter 630 passes through a converging lens 650 to converge on a location in a mirror 660, which is mounted on a moving stage 662 and a rotation stage 664. By controlling the moving stage 662 and the rotation stage 664, the mirror 640 can be configured to reflect the light beam to the holographic optical element 690 as the object beam 680 with a specified incident angle. In this case, the object beam 680 diverges from the converging location in the mirror 660 toward the holographic optical element 690.

The holographic optical element 690 is mounted on a moving stage 692 (e.g., a rail) and a rotation stage 694. The moving stage 692 and the rotation stage 694 may also be controlled to position the holographic optical element 690 for desired incident angles of the reference beam 670 and the object beam 680 in synchronization with the mirrors 640 and 660. In one embodiment, the recording system 600 may also include a control unit (not shown) to control the moving stages 642, 662, and 692 and the rotation stages 644, 664, and 694 to direct the reference beam 670 and the object beam 680 with the desired incident angles.

According to one embodiment, the laser source 612 may be configured to emit a laser beam of a specified wavelength (e.g., 532 nm) corresponding to a green color. In this case, the moving stages 642, 662, and 692 and the rotation stages 644, 664, and 694 may be controlled to direct the reference beam 670 and the object beam 680 to the holographic optical element 690 at predetermined incident angles for green color, for example, 55° and 6° as described above. The reference beam 670 and the object beam 680 irradiated in this manner produce an interference pattern associated with the green color. The interference pattern in the holographic optical element 690 is recorded as volume phase gratings.

For producing another holographic optical element for another color such as a red or blue color, the moving stages 642, 662, and 692 and the rotation stages 644, 664, and 694 may be controlled to direct the reference beam 670 and the object beam 680 to the holographic optical element at another pair of predetermined incident angles. For example, the pair of incident angles for the red color may be 48.7° and 1.4°, and the pair of incident angles for the blue color may be 58.8° and 8.5°, as described above. Although the laser source 612 is described with a laser beam of the wavelength corresponding to the green color, it may also generate a laser beam of any other suitable wavelengths such as red, blue, etc. In such cases, incident angles for the reference beam 670 and the object beam 680 may be determined based on the laser beam and the recording system 600 may configure the reference beam 670 and the object beam 680 to be irradiated on the holographic optical element 690 with the incident angles. By separately recording interference patterns on individual holographic optical elements, a diffraction efficiency may be enhanced over the case of simultaneously recording a plurality of interference patterns on a holographic optical element.

Figure 7:
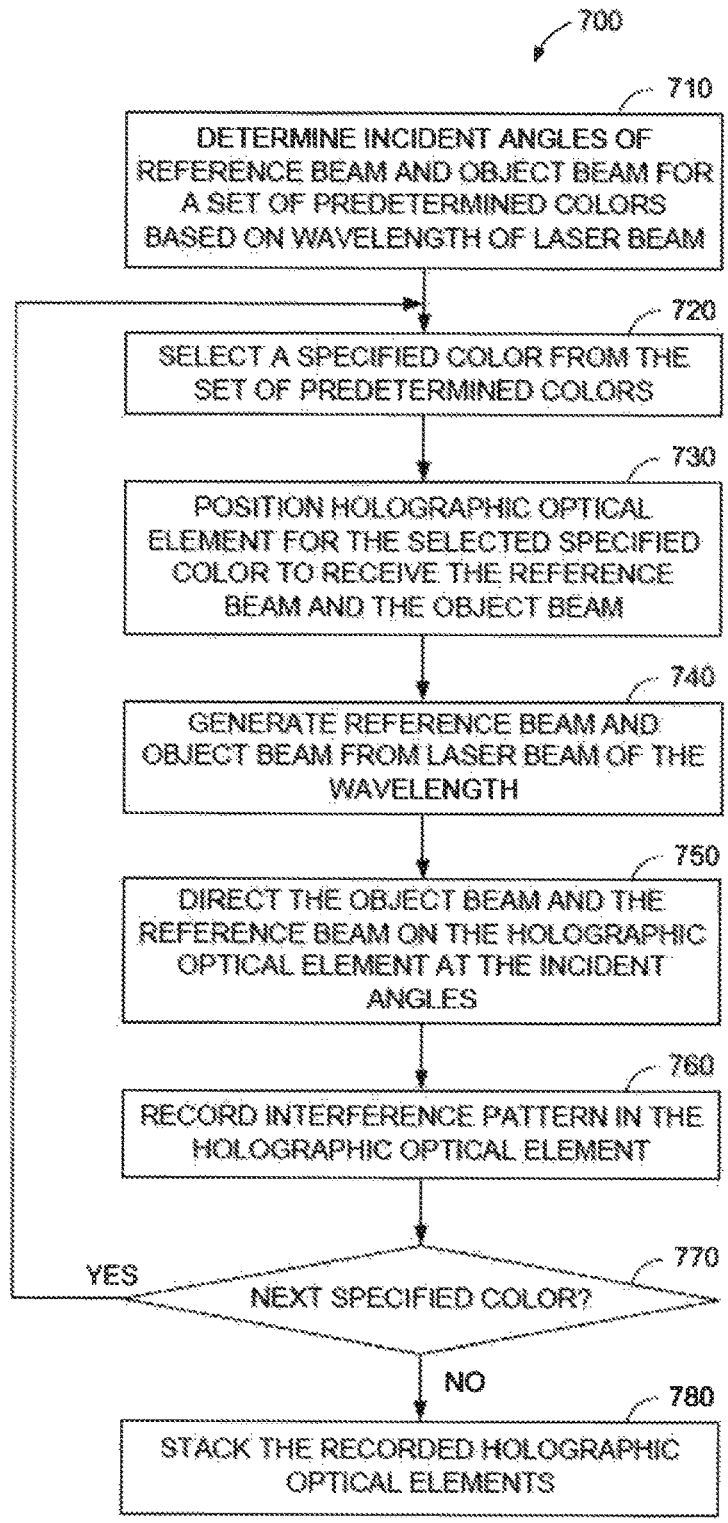
FIG. 7 illustrates a flowchart of a method, performed in a recording system, for recording a pattern of interference between a reference beam and an object beam in a holographic optical element, according to one embodiment of the present disclosure.

FIG. 7 illustrates a flowchart of a method 700, performed in the recording system 600, for recording patterns of interference between the reference beam 670 and the object beam 680 in a plurality of holographic optical elements, according to one embodiment of the present disclosure. At 710, a plurality of pairs of incident angles for the reference beam 670 and the object beam 680 are determined for a set of specified colors (e.g., red, green, and blue colors) based on a wavelength of a laser beam (e.g., 532 nm corresponding to a green color) to be emitted from the laser source 612. At 720, a holographic optical element is positioned to receive the reference beam 670 and the object beam 680 at a pair of the incident angles determined for a specified color (e.g., the red color). In one embodiment, the moving stages 642, 662, and 692 and the rotation stages 644, 664, and 694 may be controlled to position the holographic optical element.

The reference beam 670 and the object beam 680 are generated from the laser beam emitted by the laser source 612, at 730. In one embodiment, the spatial filter 614, the beam collimator 616, the beam expander 618, and the beam splitter 630 may be used for generating the reference beam 670 and the object beam 680. At 740, the reference beam 670 and the object beam 680 are directed on the holographic optical element at the incident angles determined for the specified color. Thus, an interference pattern of the reference beam 670 and the object beam 680 is recorded in the holographic optical element, at 750.

Once the recording in the holographic optical element is completed, it is determined whether there remains a next specified color (e.g., the green or blue color), at 760. If a next specified color remains, the method 700 proceeds to 720 to position a new holographic optical element to receive the reference beam 670 and the object beam 680 at a pair of the incident angles determined for the next specified color. Otherwise, if no next specified color remains, the method 700 proceeds to 770 to stack a plurality of holographic optical elements in which interference patterns have been recorded, respectively.

Figure 8:
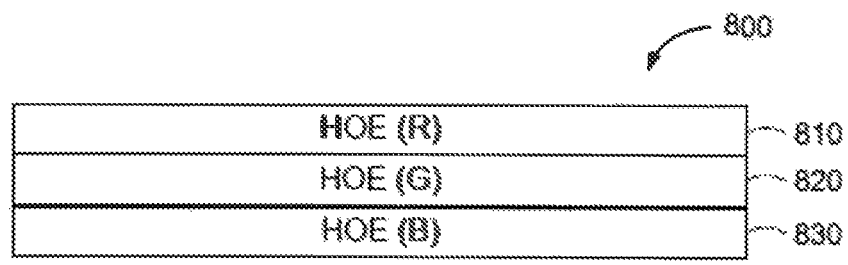
FIG. 8 illustrates a holographic optical element configured as a stack of a plurality of holographic optical elements, according to one embodiment of the present disclosure.

FIG. 8 illustrates a holographic optical element 800 configured as a stack of a plurality of holographic optical elements 810, 820, and 830, according to one embodiment of the present disclosure. Each of the holographic optical elements 810, 820, and 830 may be a volume holographic optical element. The volume holographic optical element may be a hologram in which a thickness of a recording material is larger than a wavelength of light that is used for recording one or more interference patterns. For example, the volume holographic optical element may be configured with a thickness ranging between 10 micrometers and 100 micrometers. However, any other thickness suitable for recording one or more interference patterns may be used for each of the volume holographic optical element. In some embodiments, each of the holographic optical elements 810, 820, and 830 may be a holographic photopolymer film.

As described with reference to FIG. 6, an interference pattern of a collimated reference beam and a diverging object beam may be recorded in each of the holographic optical elements 810, 820, and 830 based on a specified wavelength such as a green color (e.g., 532 nm) for the collimated reference beam and the diverging object beam. For example, the interference pattern recorded in the holographic optical element 810 is configured to diffract an incident light beam of a wavelength corresponding to a red color (e.g., 633 nm). Thus, when a light beam of the red color enters the holographic optical element 810, the interference pattern in the holographic optical element 810 diffracts the light beam to converge on a location, for example, corresponding to a left eye of a viewer. On the other hand, a light beam of another color may pass through the holographic optical element 810 without diffraction. In a similar manner, the interference patterns recorded in the holographic optical elements 820 and 830 are configured to diffract light beams of green and blue colors, respectively, to the location corresponding to the left eye, without diffracting light beams of other colors. Although the holographic optical elements 810, 820, and 830 are described as converging incident light beams on the location corresponding to the left eye of the viewer, they may also be configured to converge incident light beams to a location corresponding to the right eye of the viewer.

The holographic optical elements 810, 820, and 830 form a stack in which the holographic optical elements 830, 820, and 810 are stacked in order from bottom to top. In other embodiments, the holographic optical elements 810, 820, and 830 may be stacked in any other suitable order. The stack of the holographic optical elements 810, 820, and 830 may be used as the holographic optical element 132 or the holographic optical element 134 in FIG. 1. In the case of the holographic optical element 134, the stack of the holographic optical elements 810, 820, and 830 may be rotated 180° for use as the holographic optical element 134.

Figure 9:
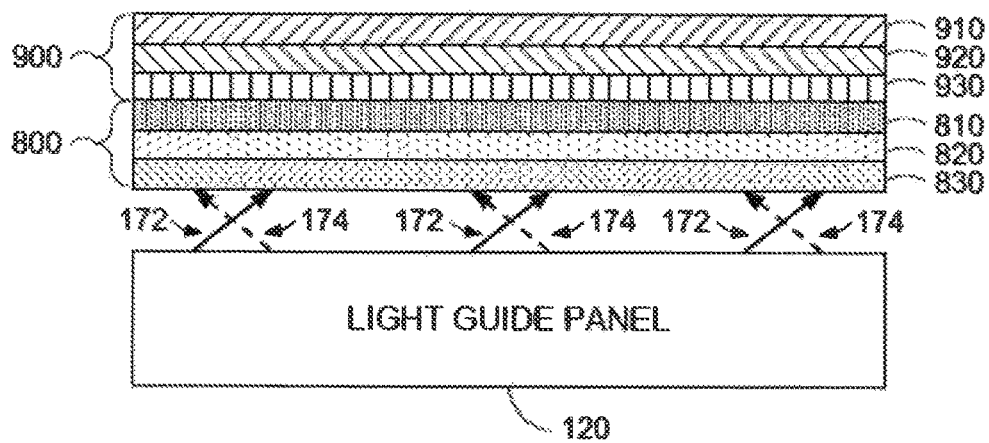
FIG. 9 illustrates a light guide panel configured to irradiate collimated light beams in first and second directions, respectively, on a stack of holographic optical elements, according to one embodiment of the present disclosure.

FIG. 9 illustrates the light guide panel 120 configured to irradiate the collimated light beams 172 and 174 in first and second directions, respectively, on a stack of holographic optical elements 800 and 900, according to one embodiment of the present disclosure. Each of the collimated light beams 172 and 174 may include light of a plurality of colors such as red, green, and blue colors. As shown, the holographic optical element 800 is configured as a stack of the holographic optical elements 810, 820, and 830 as described above with reference to FIG. 8. Similarly, the holographic optical element 900 is configured as a stack of holographic optical elements 910, 920, and 930. According to one embodiment, the holographic optical elements 800 and 900 may correspond to the holographic optical elements 132 and 134 in FIG. 1.

In some embodiments, the holographic optical elements 810, 820, and 830 may include interference patterns configured to diffract light beams of red, green, and blue colors, respectively. When the collimated light beam 172 from the light guide panel 120 is irradiated in the first direction on the holographic optical element 800, light beams of red, green, and blue colors in the light beam 172 are diffracted in the holographic optical elements 810, 820, and 830, respectively, to converge on a location corresponding to a left eye of a viewer. Similarly, the holographic optical elements 910, 920, and 930 may also include interference patterns configured to diffract light beams of red, green, and blue colors, respectively. In this case, the interference patterns in the holographic optical elements 910, 920, and 930 diffract light beams of red, green, and blue colors, respectively, in the collimated light beam 174 to converge on a location corresponding to a right eye of the viewer.

Although the holographic optical element 900 is described as being stacked on the holographic optical element 800 in the illustrated embodiment, the holographic optical elements 800 and 900 may be stacked in a reverse order. Further, although the holographic optical element 900 is described as forming a stack in which the holographic optical elements 930, 920, and 910 are stacked in order from bottom to top, the holographic optical elements 910, 920, and 930 may be stacked in any suitable order. In some embodiments, each of the holographic optical elements 800 and 900 may be configured with any suitable number of holographic optical elements to diffract light of any suitable colors. For example, one or more pairs of holographic optical elements in the holographic optical element 800 or 900 may be configured diffract light of one or more pairs of complementary colors such as yellow and purple colors, blue and orange colors, etc.

In some embodiments, a holographic optical element may include a plurality of interference patterns for different colors. For example, the holographic optical element 800 may include a first holographic optical element including interference patterns for red and blue colors and a second holographic optical element including an interference pattern for a green color. In this case, incident light of the red and blue colors may be diffracted in the first holographic optical element to converge on a location corresponding to a left eye of a viewer. Similarly, incident light of the green color may be diffracted in the second holographic optical element to converge on the location corresponding to the left eye of the viewer.

Figure 10:
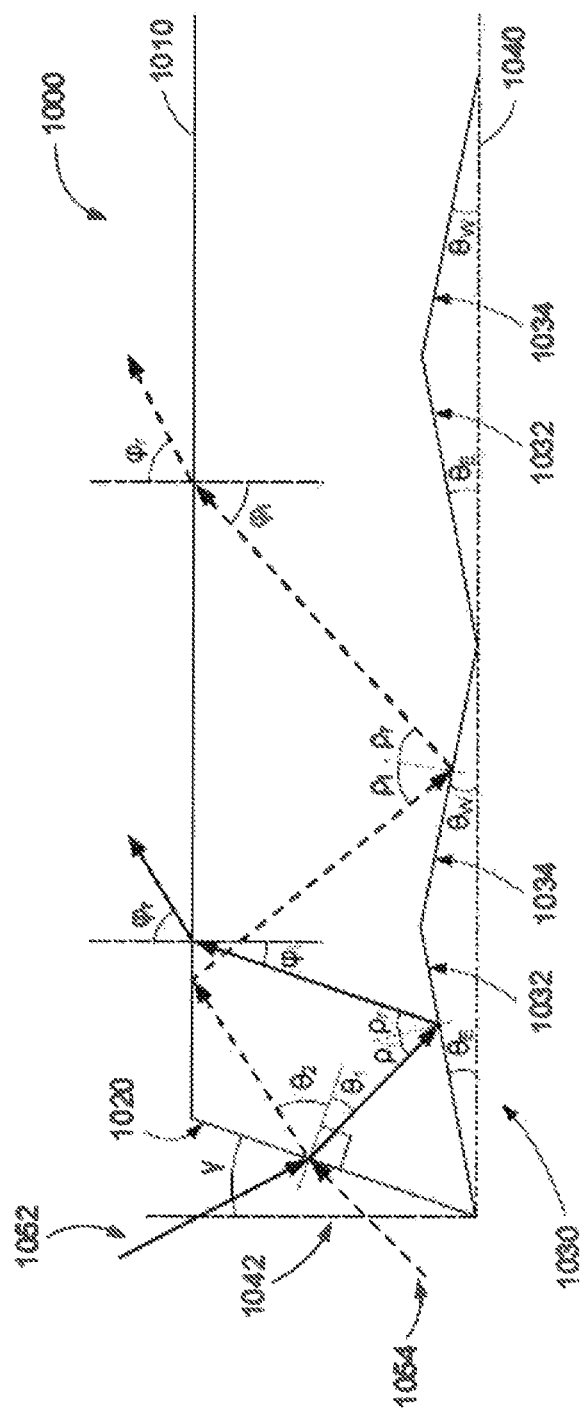
FIG. 10 illustrates a portion of a light guide panel in a sectional view that is configured to guide light irradiated from a light source in a specified direction, according to one embodiment of the present disclosure.

FIG. 10 illustrates a portion of a light guide panel 1000 in a sectional view that is configured to guide light irradiated from a light source in a specified direction, according to one embodiment of the present disclosure. As shown, the light guide panel 1000 includes a top surface 1010 adjoining a stack of a plurality of holographic optical elements such as the stack 130 of the holographic optical elements 132 and 134 in FIG. 1. The light guide panel 1000 also includes a side surface 1020 through which light from the light source is irradiated. Further, a bottom surface 1030 of the light guide panel 1000 is configured as a prism structure to reflect light from the light source toward the top surface 1010 adjoining the stack of the plurality of holographic optical elements.

The prism structure on the bottom surface 1030 is configured as a plurality of pairs of inclined surfaces 1032 and 1034. Each pair of inclined surfaces 1032 and 1034 forms a groove on the bottom surface 1030. The inclined surfaces 1032 and 1034, which may be symmetric or asymmetric, form a pair of angles of inclination $\theta_E$ and $\theta_W$, respectively, with respect to a reference plane 1040 which is parallel to the top surface 1010. In some embodiments, the angles of inclination $\theta_E$ and $\theta_W$ are less than 10° and may be identical to each other. The side surface 1020 of the light guide panel 1000 may be inclined with an angle of inclination $\gamma$ with respect to a line 1042 normal to the reference plane 1040.

In the illustrated embodiment, the light source and the light guide panel 1000 may be implemented as the light source 112 or 114 and the light guide panel 120 illustrated above in FIG. 1. The light source irradiates light 1052 on the side surface 1020 of the light guide panel 1000, and the light 1052 is refracted into the light guide panel 1000 with an angle of refraction $\theta_1$ at the side surface 1020 due to a difference in an index of refraction. The refracted light 1052 is incident on the inclined surface 1032 at an incident angle $\rho_i$ and reflected from the inclined surface 1032 with an angle of refraction $\rho_r$. In this case, the incident angle $\rho_i$ and the angle of refraction $\rho_r$ may be expressed by the following equation.

$$\rho_i = \rho_r = \frac{\pi}{2} - (\theta_I + \gamma + \theta_E) \quad \text{Eq. (14)}$$

The light 1052 reflected from the inclined surface 1032 is incident on the top surface 1010 with an incident angle (pi which may be expressed by the following equation:

$$\varphi_i = \rho_r - \theta_E = \frac{\pi}{2} - (\theta_I + \gamma + 2\theta_E) \quad \text{Eq. (15)}$$

The incident light 1052 is then refracted at the top surface 1010 with an angle of refraction $\varphi_r$ to guide the light 1052 in the specified direction toward the stack of the holographic optical elements. Based on Snell's law, the angle of refraction $\varphi_r$ may be obtained by the following equation:

$$\varphi_r = \sin^{-1}\left(\frac{n_{LGP}}{n_{air}} \sin \varphi_i\right) \quad \text{Eq. (16)}$$

where $n_{LGP}$ denotes an index of refraction of the light guide panel 1000 and $n_{air}$ denotes an index of refraction of air. For example, in the case where the light guide panel 1000 is formed of polymethyl methacrylate or polycarbonate, $n_{LGP}$ may be about 1.5 to 1.6.

As shown in FIG. 10, the light source may also irradiate light 1054 on the side surface 1020 of the light guide panel 1000 that is refracted at the side surface 1020 with an angle of refraction $\theta_2$. The refracted light 1054 is then reflected from the top surface 1010 toward the inclined surface 1034 with an incident angle $\rho_i$. The light 1054 incident on the inclined surface 1034 is reflected from the inclined surface 1034 with an angle of reflection $\rho_r$ which is identical to the incident angle $\rho_i$. The reflected light 1054 is then directed to the top surface 1010 with an incident angle $\varphi_i$ which may be expressed by the following equation:

$$\varphi_i = \frac{\pi}{2} - (\theta_Z + \gamma - 2\theta_W) \quad \text{Eq. (17)}$$

The light 1054 incident at the top surface 1010 is refracted with an angle of refraction $\varphi_r$ to guide the light 1054 in the specified direction toward the stack of the holographic optical elements. Based on Snell's law, the angle of refraction $\varphi_r$ may be obtained by the following equation:

$$\varphi_r = \sin^{-1}\left(\frac{n_{LGP}}{n_{air}} \sin \varphi_i\right) \quad \text{Eq. (18)}$$

Although the illustrated embodiment describes the light 1052 and the light 1054 as being reflected from the inclined surfaces 1032 and 1034, respectively, the light guide panel 1000 may be configured to reflect the light 1052 and 1054 any suitable number of times from one or more inclined surfaces 1032 and/or 1034. For example, when light from the light source is refracted at the side surface 1020 of the light guide panel 1000 at an angle of refraction $\theta$, the light may be reflected n times from one or more inclined surfaces 1032 and/or m times from one or more inclined surfaces 1034, where n and m are integers greater than or equal to zero.

After the light is reflected n and or m times, the light may be incident on the top surface 1010 with an incident angle at which the incident light is refracted through the top surface 1010. For example, when the incident angle is less than a critical angle for total internal reflection, the incident light may be refracted through the top surface 1010. For the light to be refracted through the top surface 1010, the incident angle $\varphi_i$ may be expressed by the following equation:

$$\varphi_i = \frac{\pi}{2} - (\theta + \gamma + 2n\theta_E - 2m\theta_W) \quad \text{Eq. (19)}$$

In addition, an angle of refraction $\varphi_r$ may be determined according to Snell's law by the following equation:

$$\varphi_r = \sin^{-1}\left(\frac{n_{LGP}}{n_{air}} \sin \varphi\right) \quad \text{Eq. (20)}$$

In one embodiment, the angles of inclination $\theta_E$ and $\theta_W$ of the inclined surface 1032 and 1034, respectively, may be set to be less than 10°. The light guide panel 1000 configured as above may guide the light irradiated from the light source in the specified direction with increased accuracy and uniformity in distribution of light intensity. For example, the light guide panel 1000 configured with the angles of inclination $\theta_E$ and $\theta_W$ less than 10° may guide the light from the light source to be refracted at the top surface 1010 with an angle of refraction greater than 45°. Additionally, the inclined surfaces 1032 and 1034 in the light guide panel 1000 may function as a Lambertian reflection surface, thereby enhancing uniform distribution of the incident light that is refracted through the top surface 1010 of the light guide panel 1000.

According to some embodiments, light from the light source may be refracted through the top surface 1010 at varying angles according to a location of the top surface 1010. In such a case, a difference between a largest angle of refraction and a smallest angle of refraction may be referred to as an angular bandwidth of the angle of refraction and the angular bandwidth may be determined according to a FWHM (Full Width at Half Maximum) method. For example, when the angles of inclination $\theta_E$ and $\theta_W$ of the inclined surfaces 1032 and 1034, respectively, are set to be less than 10°, the angular bandwidth of the angle of refraction may be narrowed to be less than 30°. As a result, a light beam guided by the light guide panel 1000 may be substantially collimated or quasi-collimated. For guiding light from the light source in a specified direction with a desired angle of refraction greater than 45°, the angles of inclination $\theta_B$ and $\theta_W$ of the inclined surfaces 1032 and 1034 may be configured at any suitable angles less than 10°.

Although the subject matter has been described in language specific to structural features and/or methodological acts, it is to be understood that the subject matter defined in the appended claims is not necessarily limited to the specific features or acts described above. Rather, the specific features and acts described above are disclosed to as example forms of implementing the claims.

What is claimed:

1. An autostereoscopic 3D display device comprising: a first light source and a second light source configured to alternately generate light; a light guide panel arranged to guide the light from the first light source in a first direction as a first light beam and the light from the second light source in a second direction as a second light beam; and a stack of a plurality of holographic optical elements configured to converge the first light beam and the second light beam from the light guide panel, wherein the light guide panel includes a prism structure configured to reflect the light from the first and second light sources toward a surface of the light guide panel adjoining the stack of the plurality of holographic optical elements; wherein the light guide panel and the prism structure are further configured to refract the light from the first and second light sources out of the light guide panel through an air gap towards the stack of the plurality of holographic optical elements; wherein the prism structure includes at least one first inclined surface having a first inclined angle and at least one second inclined surface having a second inclined angle; wherein the first and second inclined angles are less than 100; and wherein each of the plurality of holographic optical elements includes one or more interference patterns recorded by illuminating a reference beam on the holographic optical element based on one or more first incident angles and an object beam on the holographic optical element based on one or more second incident angles.

2. The autostereoscopic 3D display device of claim 1, wherein the stack of the plurality of holographic optical elements includes at least one first holographic optical element and at least one second holographic optical element, and
wherein the at least one first holographic optical element converges the first light beam to a first location, and the at least one second holographic optical element converges the second light beam to a second location.

3. The autostereoscopic 3D display device of claim 2, wherein the at least one first holographic optical element includes one or more first photopolymer films configured to diffract one or more predetermined wavelengths of the first light beam, and
wherein the at least one second holographic optical element includes one or more second photopolymer films configured to diffract the one or more predetermined wavelengths of the second light beam.

4. The autostereoscopic 3D display device of claim 3, wherein each of the one or more first and second photopolymer films is configured to diffract a red, green, or blue wavelength.

5. The autostereoscopic 3D display device of claim 1, wherein each of the plurality of holographic optical elements includes an interference pattern of a parallel light beam and a diverging light beam.

6. The autostereoscopic 3D display device of claim 1, wherein each of the plurality of holographic optical elements is a volume holographic optical element.

7. The autostereoscopic 3D display device of claim 1, wherein the light guide panel is configured to refract the light reflected from the prism structure toward the stack of the plurality of holographic optical elements with an angle of refraction greater than 45°.

8. The autostereoscopic 3D display device of claim 7, wherein the light guide panel is configured to guide the light from the first and second light sources as the first and second light beams having a substantially uniform intensity distribution.

9. The autostereoscopic 3D display device of claim 8, wherein an angular bandwidth of the refracted light is less than 30°.

10. The autostereoscopic 3D display device of claim 1, further comprising:
a display panel configured to display a first set of images and a second set of images; and
a control unit configured to alternately activate the first and second light sources and control the display panel to alternately display one of the first set of images and one of the second set of images.

11. The autostereoscopic 3D display device of claim 10, wherein the control unit is configured to generate at least one control signal to synchronize the display of the one of the first set of images and the one of the second set of images with the activation of the first and second light sources.

12. The autostereoscopic 3D display device of claim 10, wherein the one of the first set of images and the one of the second set of images correspond to a pair of stereoscopic images, and
wherein the control unit is configured to control the display of the first and second sets of images based on a vertical synchronization signal generated for displaying each pair of the stereoscopic images or a predetermined number of horizontal synchronization signals.

13. The autostereoscopic 3D display device of claim 1, wherein the one or more interference patterns are configured to diffract one or more predetermined wavelengths.

14. The autostereoscopic 3D display device of claim 1, wherein the first incident angles of the plurality of holographic optical elements are different from each other, and
wherein the second incident angles of the plurality of holographic optical elements are different from each other.

15. The autostereoscopic 3D display device of claim 1, wherein a pair of angles including one of the first incident angles and one of the second incident angles is determined based on a Bragg-angle condition for a red, green, or blue wavelength.

16. The autostereoscopic 3D display device of claim 1, wherein the first and second light beams are quasi-collimated with an angular bandwidth of less than 30°.

* * * * *